United States Patent [19]

de la Haye et al.

[11] 4,300,850
[45] Nov. 17, 1981

[54] JOINING

[75] Inventors: Robert de la Haye, Harpenden; John A Matthews, Clifton; Malcolm J. Potton, Ampthill; Steven P. Cook, Arlesey, all of England

[73] Assignee: Cidinge Limited, London, England

[21] Appl. No.: 50,948

[22] Filed: Jun. 21, 1979

[30] Foreign Application Priority Data

Jun. 22, 1978 [GB] United Kingdom ............... 27684/78

[51] Int. Cl.³ .............................................. F16B 21/02
[52] U.S. Cl. ..................................... 403/245; 403/381
[58] Field of Search ............... 403/245, 246, 254, 255, 403/316, 317, 319, 360, 381, 231, 6, 7, 8; 5/298

[56] References Cited

U.S. PATENT DOCUMENTS 1,602,658 10/1926 Germain .................................. 403/8
3,580,535 5/1971 Naske ................................... 248/239
4,030,846 6/1977 Flototto ............................... 403/231
4,163,618 8/1979 Giovannetti ........................ 403/245

FOREIGN PATENT DOCUMENTS 999042 7/1965 United Kingdom ..................... 403/7
6601003 7/1966 Netherlands ......................... 403/231

Primary Examiner—Andrew V. Kundrat

[57] ABSTRACT

Coupling means, for example for use in the furniture industry, comprises a body member having a threaded opening which communicates with an internal cavity; an elongate headed member, a shank portion of which is receivable through a slot formed in the side of the body member with its head retained within the cavity; and a threaded member receivable in the threaded opening and adapted to bear against the head of the headed member. The interior of the cavity is so shaped that tightening of the threaded member in the opening is arranged to draw the shank of the headed member further through the slot into the interior of the cavity.

9 Claims, 5 Drawing Figures

U.S. Patent  Nov. 17, 1981  Sheet 1 of 2  4,300,850
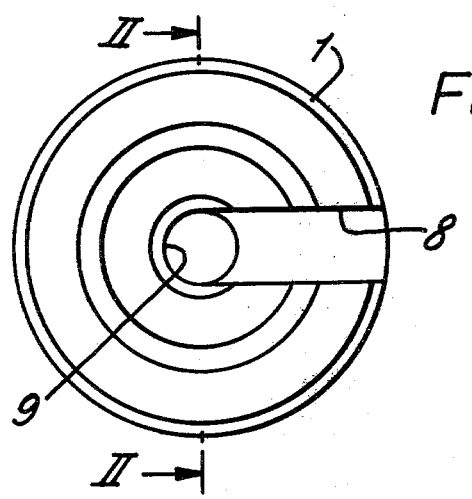
FIG.1.
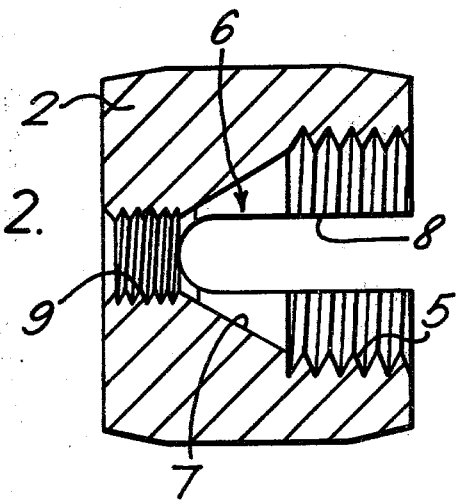
FIG.2.
FIG.3.
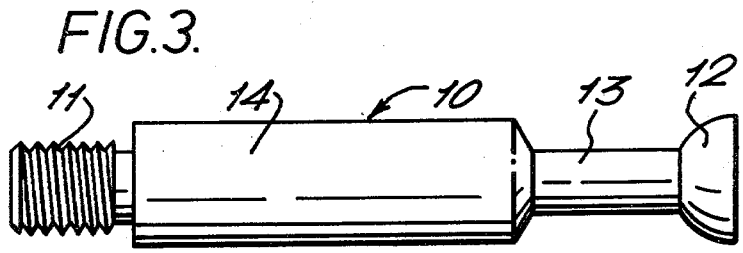

JOINING

FIELD OF THE INVENTION

This invention relates to the joining of members together. As will become clear from the description which follows, embodiments of coupling means constructed in accordance with this invention are particularly useful for interconnecting panels in the furniture industry, although the invention is also of wider utility.

BACKGROUND OF THE INVENTION

Nowadays the trend in the furniture industry is towards so-called "quick-assembly" or "knock-down" furniture (hereafter referred to as "KD furniture"). KD furniture is manufactured as a number of components adapted for ready assembly (and frequently also for ready disassembly) by the retailer or purchaser. As compared with traditional furniture, KD furniture has two great advantages. Firstly, it can be transported and sold in flat packs which take up relatively little space. Consequently transporting and warehousing costs are substantially reduced. Because the furniture takes up so little space, a retailer can readily keep stocks of KD furniture in its flat packs in his furniture store so that the customer can take away his purchase immediately. Surveys have shown that the purchasing of furniture is frequently by impulse and a customer is severely disappointed if, as frequently happens with traditionally manufactured furniture, to obtain the furniture which he sees on display he must wait weeks and often months for delivery.

The principles of KD furniture design can be applied to most kinds of furniture. A new type of furniture which makes best use of the principles of KD furniture design is so-called "systems furniture". Systems furniture consists of relatively small components which can be coupled together by the purchaser in various combinations to provide him with different eventual shapes and configurations for his furniture. Moreover, the design of the system can be altered either by re-arrangement or by addition of further components. Systems furniture is often assembled from flat panels of various sizes and coupling means for assembling the panels together.

Since the items of KD or systems furniture may be assembled by a relatively unsophisticated purchaser, the coupling means employed should be both reliable and relatively easy to use. A number of different forms of coupling means have been previously proposed. We have not found any heretofore which is in our view entirely satisfactory. It is frequently difficult to ensure precise alignment of apertures for connecting parts. Manufacture of furniture components to close tolerances would make them uneconomically expensive. It is thus highly desirable in our view for the coupling components to be at least to some extent self locating.

STATEMENT OF THE INVENTION

In accordance with one aspect of the present invention, we provide coupling means, comprising: a body member having a threaded opening which communicates with an internal cavity; an elongate headed member, a shank portion of which is receivable through a slot formed in the side of the body member with its head retained within the cavity; and a threaded member receivable in the threaded opening and adapted to bear against the head of the headed member, the interior of the cavity being so shaped that tightening of the threaded member in the opening is arranged to draw the shank of the headed member further through the slot into the interior of the cavity.

Preferably, the interior of the cavity is formed with a sloped internal surface (and preferably a frustoconical internal surface) adjacent the slot and along which the head of the headed member may slide or cam as the threaded member is tightened in the threaded opening.

When the coupling means is to be used to interconnect two flat panels in KD or systems furniture, each panel may be formed with a through bore in a region adjacent an edge and with a passage at right angles to the through bore and opening in the through bore and at the said edge of the panel. The headed member is inserted through the passageway head first from the edge of the panel. Suitably its extreme shank end is formed with a threaded portion for connecting the headed member to a connecting block or rod suitably square in cross section each side being generally of the same width as the panel and the connecting rod being formed with through bores at right angles to each other for receiving the respective threaded shank ends of headed members. With the headed member extending into the through bore in the panel, the body member is pushed into the through bore so that the sides of the slot embrace the shank of the headed member and so that the head of the headed member lies within the cavity. If the threaded member is then inserted into the through bore from the other side into engagement with the threaded opening of the body member and is tightened, the headed member may be drawn further into the cavity to bring the connecting rod into firm engagement with the edge of the panel. A second panel may be similarly connected to the connecting rod on another side thereof. In this way a whole system may be interconnected.

Embodiments of coupling means in accordance with this invention may be utilised in other ways. For example a panel or first structural element may be coupled to a second structural element if the first element is provided with a through bore in which the body member is received and also with a passage opening into the through bore at right angles to its axis and also opening at an external surface of the first element. The shank end of the headed member is received in the second structural element (which may for example be provided with a threaded socket for receiving a threaded end of the headed member; alternatively, the headed member way be fixedly joined to the second element as by glue) so that the headed member extends outwardly from the second element and may be received through the passage such that its head extends into the through bore so that the body member may be pushed into the through bore so that the sides of its slot embrace the shank of the headed member with the headed member retained within the cavity of the body member, all as before.

BRIEF DESCRIPTION OF THE DRAWINGS

FIG. 1 shows a body member of an embodiment of coupling means constructed in accordance with this invention in plan.

FIG. 2 shows an axial sectional view of the body member of FIG. 1 taken along the line II—II.

FIG. 3 is a side elevational view of a headed member of an embodiment of coupling means in accordance with the present invention.

DESCRIPTION OF THE PREFERRED EMBODIMENTS

Figure 4:
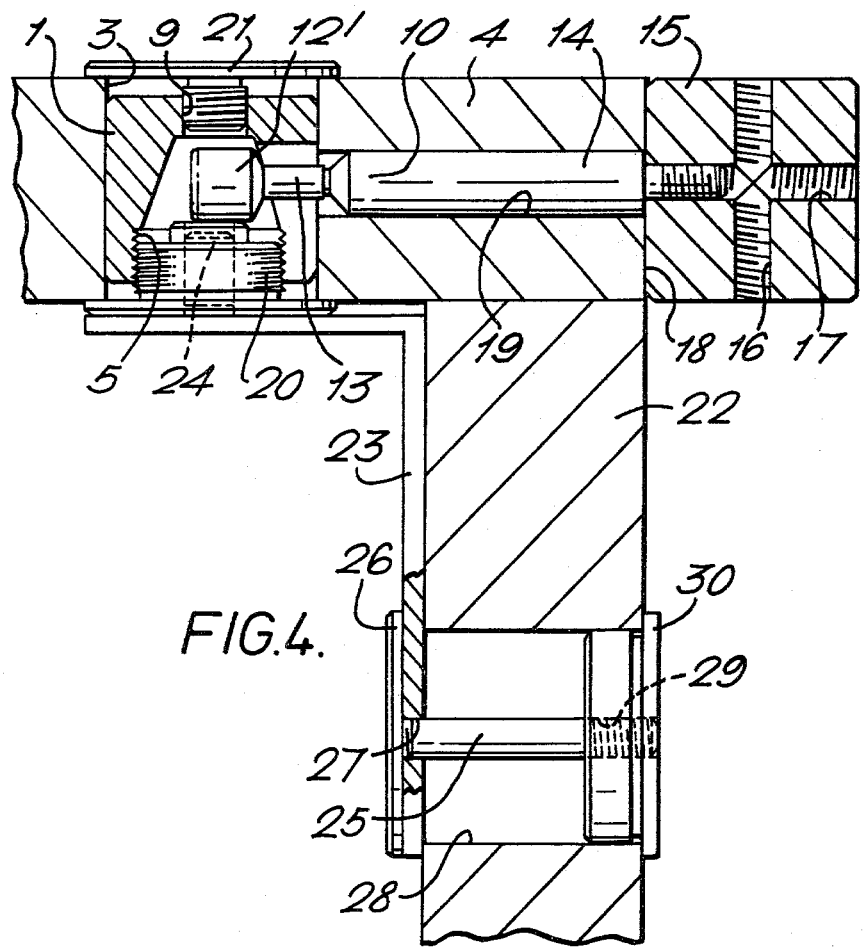
FIG. 4 is a side elevational view mostly in section showing the manner of use of an embodiment of coupling means in accordance with the present invention.

As is clear from FIGS. 1 and 2, the body member 1 is formed from a generally cylindrical body of material the ends of which are bevelled slightly, as at 3 to aid insertion of the body member into a through bore, such as 3, formed in a panel such as 4 (see FIG. 4). Body member 1 has a threaded opening 5 which communicates with an internal cavity 6, which as shown has a frustoconical internal wall 7. The side wall of the body member is provided with a slot 8. The end of body member 1 opposite threaded opening 5 may also be open as at 9. This opening may also be threaded.

The elongate headed member 10 shown in FIG. 3 has a threaded portion 11 at the end of the shank opposite to the head 12. Apart from a reduced diameter portion 13, the shank 14 may have the same external diameter as the head 12.

Reference may now be made to FIG. 4 which illustrates one application of an embodiment of coupling means constructed in accordance with the present invention. It will be noted that both the body member and the headed member of the coupling means of FIG. 4 differ slightly in configuration from those illustrated in FIGS. 1 to 3. For convenience like reference numerals are used for the like parts in the different figures.

FIG. 4 is not intended to depict a portion of furniture joined by means of an embodiment of coupling means. Instead, the figure is intended to illustrate ways in which the coupling means may be employed.

Attention is first directed to a connecting block or rod 15 suitably square in cross section, as here shown, each side being of the same width as the panel 4. The connecting rod 15 is formed with through bores 16 and 17 at right angles to each other and may be formed with similar through bores at intervals along its length. Each of the through bores is threaded for receiving the respective threaded end portion 11 of a headed member 10. In order to connect rod 15 to the edge 18 of a panel such as 4, the threaded end 11 of a headed member 10 is first threaded into a bore such as 17, as illustrated. Head 12' is then inserted into a passage 19 which extends at right angles to the through bore 13 in panel 4 and opens in the said through bore at the edge 18 of the panel. With headed end 12' of member 10 extending into through bore 3, a body member 1 is pushed into the through bore so that the sides of its slot 8 embrace the reduced diameter portion 13 of shank 14 of the headed member. A threaded member 20 is inserted into threaded opening 5 of body member 1 and tightened. In so doing, it will come into contact with head 12' which is retained within the cavity 6 of body member 1. As a result, head 12' slides or cams along the sloping internal wall 7 (here frustoconical) of the cavity under the continuing tightening pressure of threaded member 20 there-against. In practice, since shank 14 is retained in side passage 19 to the through bore 3, it is the body member 1 which actually slides within its through bore. The slope of wall 7 causes the headed member to be drawn further along passage 19 of through bore slot 8 into cavity 6 resulting in firm engagement of connecting rod 15 with edge 18 of the panel.

If this procedure is repeated with insertion of the shank end 11 of a similar headed member 10 into bore 16 of connecting rod 15, a similar panel may be joined to connecting rod 15 at right angles to the first panel. By repeating this procedure, an embodiment of systems furniture may be built up. The furniture can be readily disassembled simply by withdrawing the threaded member 20 and pushing body member 1 over head 12' of headed member 10 and out of its through bore 3 so that the headed member 10 can be withdrawn through bore passage 19.

It will be appreciated that the shape of inner wall 7 of cavity 6 need not be frustoconical. It need not even consist of a surface or revolution. It would be sufficient to provide a sloping wall region which monotonically approaches the axis of the threaded opening 5 adjacent the slot to provide a cam surface for the head of the headed member to slide relatively to the body member. The adoption of a frustoconical surface makes fabrication easier. We have found that the cone half-angle should preferably be 30° for best results. As will be seen from a comparison between FIGS. 3 and 4, we have also tested different configurations for the head of the headed member. That which we currently prefer is that illustrated in FIG. 3.

In order to close the through bore 3 against the possible ingress of foreign matter and to produce a pleasing appearance, a metal cover plate such as 21 may be threaded into opening 9 of body member 1. A similar cover plate may be integrally formed with threaded member 20 to close the other end of the through bore.

In assembling KD or systems furniture, particular attention has to be given to the structural parts (i.e. the parts which bear the weight of the furniture itself and of anything which may be placed upon it in use). For this reason, we prefer to connect together the load bearing uprights or sides of the KD furniture or units of the system and the load bearing horizontal members such as shelves or top panels in the manner described hereinabove. It may well not be necessary for the backs of the units or of KD furniture which will not be load bearing to be interconnected in the same way. As shown in FIG. 4, a back panel 22 may be connected to panel 4 by means of an intermediate L-shaped bracket 23 which has a stud 24 extending outwardly thereof. The stud 24 may be received in a centre aperture in threaded member 20. The other end of bracket 23 is connected to panel 22 by means of an elongate threaded member 25 provided with a substantial head 26 of appearance similar to cover plate 21, the shank of threaded member 25 being received through an aperture 27 of bracket 23, extending through a bore 28 in the panel 22 and being received at its end in a socket 29 of a further member 30 the external appearance of which may again be similar to cover plate 21.

Figure 5:
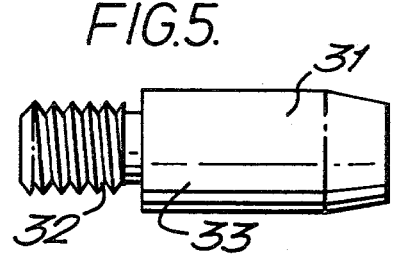
FIG. 5 shows a view generally similar to FIG. 3 of a back location pin useful in an embodiment of systems furniture in which the principal components are interconnected by means of an embodiment of coupling means of the kind shown in FIG. 4.

In an alternative arrangement, location pin 31 of FIG. 5 may be employed. Location pin 31 is of configuration similar to the left-hand end of headed member 10 as depicted in FIG. 3 having a threaded end portion 32 generally similar to threaded portion 11 and a shank portion 33 of external diameter the same as shank 14 of headed member 10. Thus, the threaded end 32 of location pin 31 can be received in the bores 16 or 17 of a connecting rod 15 and the shank portion 33 of pin 31 is sized to allow a panel similar to panel 4 to be loosely coupled thereto by simply sliding shank portion 33 into a passage 19.

What is claimed is:

1. Coupling means, comprising:
a generally cylindrical hollow body member adapted for axial sliding reception in a corresponding cylindrical bore of a structural member, the body member having an internal surface defining an internal cavity of said body member, an axial end face in which is defined a threaded opening which communicates with and terminates at said internal cavity and a cylindrical side wall in which is formed a through bore slot communicating with said cavity, said slot extending to said axial end face and to said threaded opening;
an elongate headed member having a shank portion of diameter substantially less than the head of the headed member which shank portion is receivable in said slot with the head of said elongate headed member retained within said cavity beyond said slot;
and a threaded member receivable in said threaded opening and adapted to bear against the head of said headed member the interior of said cavity being so shaped that axial threaded tightening insertion of said threaded member in said opening is arranged to draw the shank of said headed member further through said slot into the interior of the cavity.

2. Coupling means according to claim 1, wherein said interior surface defining said cavity includes a sloped internal surface portion adjacent said slot and along which the head of said headed member may slide in a cam fashion as said threaded member is tightened in said threaded opening.

3. Coupling means according to claim 1, wherein said interior surface defining said cavity comprises a frustoconical surface along which the head of said headed member may slide in a cam fashion as said threaded member is tightened in said threaded opening.

4. Coupling means according to claim 3, wherein the axis of said threaded opening and the axis of said frustoconical surface coincide, and wherein the frustoconical surface defines a cone half-angle of 30°.

5. Coupling means according to claim 3, wherein the head of said headed member includes a part-spherical surface adjacent the connection between head and shank of the said member, which part-spherical surface is arranged to slide along said frustoconical surface.

6. A structure comprising a first structural element releasably coupled to a second structural element by a coupling means according to claim 1, the first element having surfaces defining a through bore in which the body member is received and defining a passage opening into the through bore at right angles to its axis and also opening at an external surface of the first element, the shank end of the headed member being received in the second element so that the headed end of the headed member extends outwardly from the second element.

7. Coupling means for connecting a first panel to a second panel at right angles, said means comprising: two sets of coupling means, one for each panel, and an elongate connecting block;
each said coupling means comprising:
a hollow body member having an internal surface defining an internal cavity of said body member, an end face in which is defined a threaded opening which communicates with said interanl cavity and a side wall in which is formed a through slot;
an elongate headed member having a shank portion which is receivable through said slot with the head of said elongate headed member retained within said cavity;
and a threaded member receivable in said threaded opening and adapted to bear against the head of said headed member, the interior of said cavity being so shaped that tightening of said threaded member in said opening is arranged to draw the shank of said headed member further through said slot into the interior of the cavity;
the end of each headed member remote from its head being threaded, and the connecting block being provided with threaded bores at right angles to each other for receiving the threaded ends of the headed members.

8. Furniture in kit form, comprising at least one connecting means according to claim 7 and at least two panels adapted to be interconnected at right angles thereby, wherein:
said connecting block is square in cross-section, each side of the square being generally of the same width as the two panels; and
each said panel is formed with surfaces defining a through bore of dimensions adapted to receive a said body member, and a passage extending between and opening at the said through bore and an adjacent edge of the respective panel, which passage is of dimensions adapted to receive a said headed member;
whereby with the shank end of a said headed member threaded into a bore of the connecting block and the head of the headed member inserted through the said passage into the through bore, a said body member may be pushed into the through bore from one side of the panel so that the sides of its slot embrace the shank of the headed member with the head thereof being received within the cavity of the body member, whereupon tightening of a said threaded member in the threaded opening is effective to bring the connecting rod into firm engagement with the edge of the panel.

9. Furniture according to claim 8 wherein each said threaded member is apertured to define a central aperture, wherein in the end face of each said body member opposite the end face in which is defined said threaded opening there is defined a central aperture, and wherein a respective cover plate closes the axial end of each said through bore, each cover plate including a central stud received in a respective central aperture.

* * * * *

UNITED STATES PATENT OFFICE
CERTIFICATE OF CORRECTION

Patent No. 4,300,850      Dated November 17, 1981

Inventor(s) Robert de la Haye et al.

It is certified that error appears in the above-identified patent and that said Letters Patent are hereby corrected as shown below:

Column 3, line 52, "bore 13" should be --bore 3--.

Column 4, line 1, "through bore slot 8" should be --through slot 8--.

Column 4, line 14, "bore passage 19" should be --passage 19--.

Column 5, line 13, "through bore slot" should be --through slot--.

Column 6, line 7, "interanal" should be --internal--.

Signed and Sealed this

Twenty-fifth Day of May 1982

[SEAL]

Attest:

Attesting Officer

GERALD J. MOSSINGHOFF
*Commissioner of Patents and Trademarks*